United States Patent Office 3,014,500
Patented Dec. 26, 1961

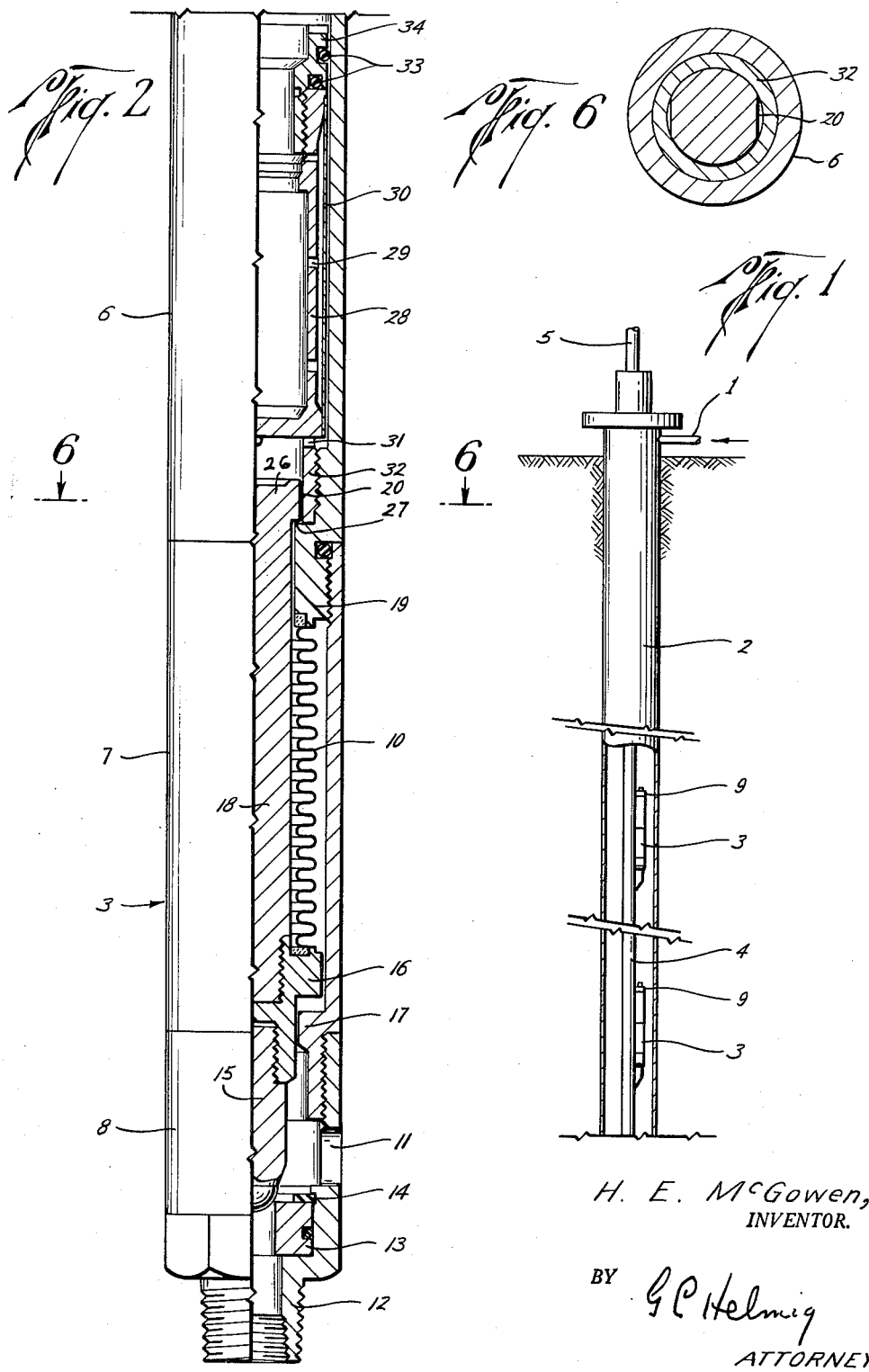
Dec. 26, 1961    H. E. McGOWEN, JR    3,014,500
EXPANSIBLE CHAMBER ACTUATOR FOR GAS LIFT VALVE
Filed Dec. 15, 1958    2 Sheets-Sheet 1
H. E. McGowen, Jr.
INVENTOR.
BY G. C. Helmig
ATTORNEY

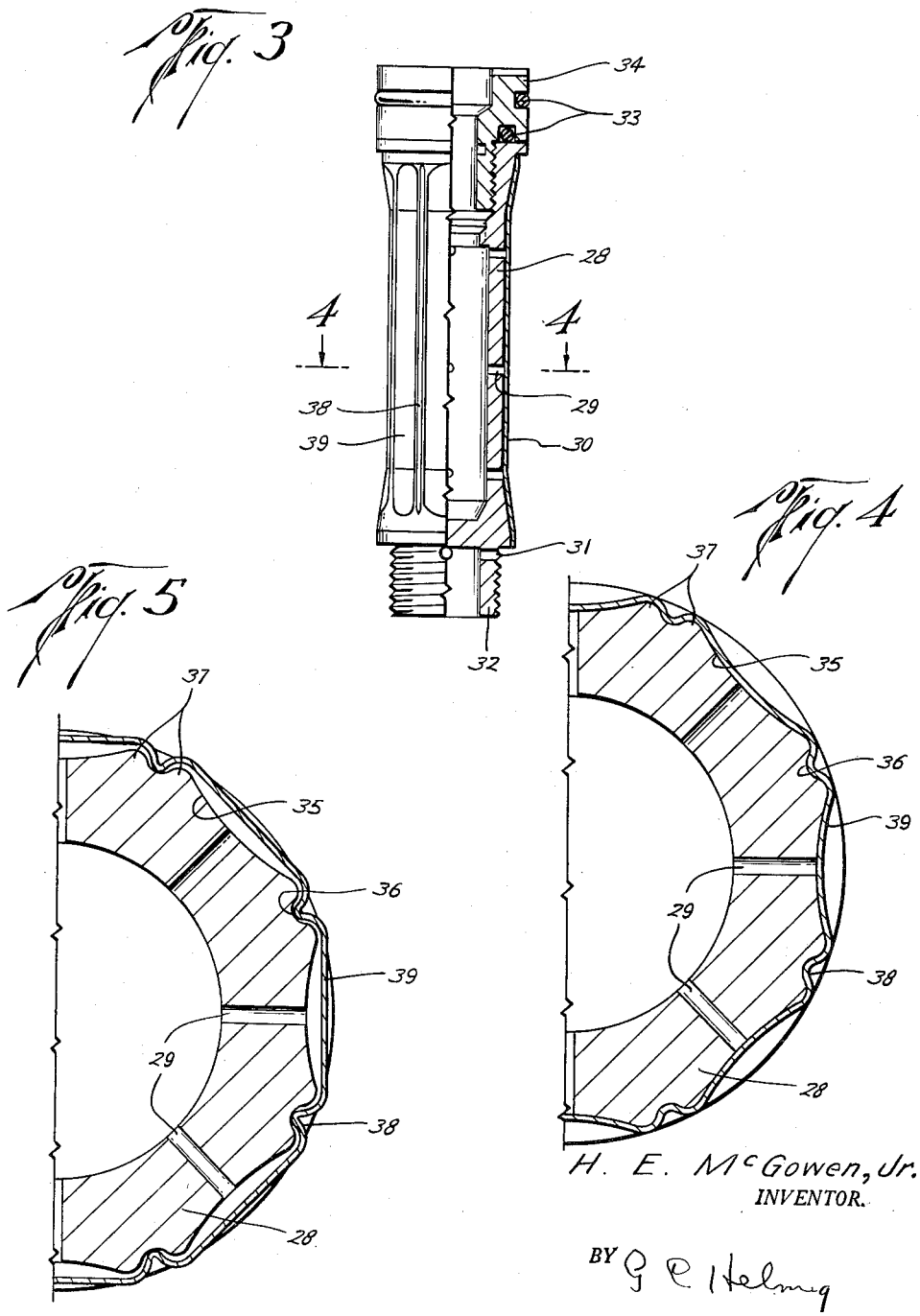

3,014,500
EXPANSIBLE CHAMBER ACTUATOR FOR GAS LIFT VALVE
Harold E. McGowen, Jr., Houston, Tex., assignor to Camco, Incorporated, Houston, Tex., a corporation of Texas
Filed Dec. 15, 1958, Ser. No. 780,503
4 Claims. (Cl. 137—777)

This invention relates to pressure responsive control devices and more particularly to an improved self-acting valve intended especially for installation as part of a gas-lift system by which well fluids are raised to the surface.

A conventional method of producing an oil well is by periodic injection of pressure gas into the liquid column at one or more levels, each under control of a poppet valve which is sensitive to lift gas pressure acting in opposition to an elastic force and directly on valve surfaces facing oppositely to other surfaces and which latter surfaces are removed from exposure to the pressure gas by being enclosed within a sealed chamber in a locating housing and formed in part by a thin flexible wall of the bellows type to accommodate valve travel to and from its injection passage closing seat. Rupture and fatigue breakdown of the thin bellows wall tend to occur under high differential pressures on opposite sides of the bellows wall and also under severe vibration or valve chatter when the bellows folds rapidly bend back and forth with quick direction reversals at high rates of vibration. In addition, such vibration occurring from slight surges in nearly balanced opposing forces when the valve seating surfaces are nearly closed, results in pounding and wire drawing or flow scoring and causes quick wearout of the closure seats.

It is an object of the present invention to provide an improved valve assembly in which the foregoing mentioned difficulties are effectively overcome by the entrapment within the bellows of an incompressible liquid which flows within the bellows space upon bellows contraction and expansion to transmit valve controlling opposing forces but which liquid flow is at a restricted rate for hydraulically checking valve vibration and minimizing bending strain in the folds of the bellows and is stopped beyond a given range of bellows contraction travel and then offers solid resistance to further deflection stress on the thin wall.

A further object of the invention is to provide a valve assembly in which a variable volume sealed chamber afforded by a hollow housing and a movable bellows wall is subdivided into a liquid filled chamber part adjacent the bellows and another chamber part charged with pressure gas acting on the liquid in opposition to valve opening movement and wherein the subdivision is afforded by a partition comprising a pair of tubular walls sleeved on one another and sealed together at opposite ends and one wall being imperforate and flexible for deflection radially in response to fluid pressures on opposite faces thereof and the other wall being rigid and perforated for connecting the space between adjoining faces of the walls with the chamber space on the other side of the rigid wall and which adjoining faces come into coextensitve abutment as a limit stop to flexible wall deflection under liquid transmitted force and as a stress resistant solid backing for the flexible wall.

Another object of the invention is to provide an improved double wall partition within the housing chamber and in which the abutment face of a rigid tubular wall is formed with shallow and alternately wide and narrow flutes between axial ribs arranged in widely spaced apart sets of two closely spaced ribs and over which rigid tube a thin cylindrical wall of flexible metal can be sleeved and conveniently subjected either before or after assembly to a deforming pressure to shape the thin wall into substantial conformity with the flutes, whereby the thin flexible wall contains circularly spaced narrow bends to project internally of the grooves spacing the ribs of each pair and wherein the small arcuate bend curvatures will readily increase or decrease in compensation for shortening and elongation of the relatively wide and more highly flexible thin wall segments which extend across and in bridging relation with the wider flutes and for radial deflection toward and from chordal planes under dominant fluid pressures on one or the other faces of the flexible segments.

A still further object of the invention is to control forced flow of liquid entrapped within the chamber space for damping motion direction reversals of the movable valve parts, and such control is afforded by restricted clearance between submerged and relatively sliding surfaces fitted to predetermined close dimensions for a retardation of the rate of travel as permitted by the amount of liquid metered through the restricted clearance passage.

The above and other objects and advantages will become apparent during the course of the following specification having reference to the accompanying drawing wherein FIG. 1 is a schematic representation of an oil well with a casing partly broken away to illustrate in elevation a production conduit having intermittent communication with the casing annulus at different levels through automatic valves of the type with which the present invention is concerned; FIG. 2 is a longitudinal section with parts in elevation of a valve assembly embodying the invention; FIG. 3 is a detail view half in elevation and half in section of a double walled partition illustrating the flexible wall in face to face abutment with its rigid abutment wall; FIG. 4 is a fragmentary transverse section as on line 4—4 of FIG. 3; FIG. 5 is a view similar to FIG. 4 except that the flexible wall is radially deflected or buckled outwardly from the rigid wall; and FIG. 6 is a transverse section on line 6—6 of FIG. 1.

In the usual gas lift system, as seen in FIG. 1, pressure gas is supplied through a conduit 1 to the interior of the well casing 2, and under control of suitable valves 3 at selected levels pushes well fluids upwardly through a production conduit 4 to a runoff pipe 5 at the surface.

As here proposed, each control valve 3 has a hollow housing comprising a number of tubular sections, such as shown at 6, 7 and 8, conveniently formed separately and threaded together in end to end succession. The hollow housing also includes conventional parts not shown in detail in the drawing, such as a cover 9 (see FIG. 1) threaded over the top of the upper tubular section 6, as well as a closure plug and an inflation valve by which a charge of pressure gas can be injected into or bled from a sealed chamber within the housing. The entrapped pressure gas preferably is an inert substance such as nitrogen. The chamber within the housing is of a variable volume inasmuch as one of its walls is movable and preferably constituted by a flexible bellows 10 secured and sealed at one end to the bottom of the housing section 6 and at its opposite or free end to a movable valve assembly. The bellows and movable valve are caged within the hollow tubular sections 7 and 8 and exteriorly are exposed to the pressure of lift gas during normal operation and which enters from the casing enclosed annulus space through one or more ports 11 into the valve chest. The thin flexible wall 10 thus seals off oppositely facing surfaces of the movable valve with respect to the action thereon of opposing pressure forces, and pressure lift gas on the outside is elastically opposed by the inside force of pressure gas entrapped within the variable volume chamber afforded interiorly of the tubular housing section 6 and the bellows.

The lower housing section 8 terminates in a threaded nipple 12 by which the housing assembly can be mounted on the production conduit 4 of the well for communication with the conduit interior and either with or without the insertion of an ordinary backflow check valve. Valve controlled communication is through a renewable valve seating ring 13 mounted within the housing section 8 as by means of a split retainer ring 14. Engageable with the valve seat 13 is a tapered or rounded valve tip of wear resistant metal at the bottom of a valve stem 15 removably threaded in the lower end of a bellows end closure plug or adapter 16. This adapter plug 16 includes a peripheral rim for sealing securement to the movable free end of the bellows element 10 and below the bellows the plug 16 has sliding bearing with an internal annular rib 17 on the housing section 7 to guide the valve element axially to and from the annular seat 13. This slide bearing fit has sufficient clearance to permit fluid leakage and pressure equalization on opposite sides of the rib 17.

Most of the internal space within the bellows 10 is occupied by an upstanding post or valve stem extension 18 whose lower end is threaded into the adapter plug 16 and whose upper end extends through and beyond an internal annular rib 19 integral with the lower terminal of the housing section 6 in the region of threaded connection with the housing section 7. Internally the rib 19 affords a relatively unrestricted clearance passage with the stem portion extending therethrough but the housing wall above the rib is lined by a cylinder 32 to which is closely fitted and slidably guided a piston head or terminal enlargement 26 on the stem 18, and the fit of these bearing surfaces is accurately controlled to a given clearance affording a metered passageway for constricted flow therethrough of liquid entrapped interiorly of the bellows. Conveniently, a pair of oppositely disposed flats are milled in the piston periphery for a given size passage 20 across the piston, which otherwise has a close guide bearing fit on the cylinder 32. By reason of the constricted passage 20, movement therethrough of liquid can only be at a selected retarded volume in relation to pressures on the liquid. Thus the liquid is a motion transmitting element between opposing forces which on one hand is the pressure of well operating lift gas within the valve cage acting exteriorly of the bellows to raise the valve and on the other hand is elastic fluid entrapped within the variable volume chamber, and the valve moves according to whichever force is dominant, but the rate of movement is that at which liquid is free to flow from one end to the other of its space occupying region.

The piston head enlargement 26 of the stem 18 presents a downwardly facing shoulder 27 which normally is spaced above the internal rib 19 in the assembly and when the valve 15 is seated at its lower limit. In the event either or both of the housing sections 7 and 8 are disassembled for inspection or replacement of worn parts, the shoulder 27 in co-operation with the rib 19 affords an abutment stop against axial expansion of the bellows 10 beyond a safe limit.

A limit to axial contraction of the bellows 10 is afforded by stopping upward flow of entrapped liquid, and for this purpose the liquid is engageable with a partition dividing the housing chamber into a liquid filled part and a pressure gas charged part. This partition, as illustrated, comprises a pair of tubular sleeves forming a double wall in which one wall is rigid and is sealed to the ends of the other wall, the latter being flexible and by its deflection serving to transmit force between the two chamber contained fluids within a limit afforded in one direction by coextensive abutment of the flexible wall with the rigid wall. The rigid wall is the cylindrical portion 28 of a steel cup containing a set of perforations 29 therethrough and the flexible wall is a seamless imperforate tube 30 of copper, stainless steel or the like closely sleeved on the rigid wall. Opposite ends of the flexible wall 30 beyond the region of the perforations 29 are secured and sealed in leakproof relation with adjoining peripheral portions of the wall 28.

In outside diameter the double wall partition is slightly less than the internal diameter of the housing section 6, so that an annular clearance normally exists which is filled with liquid at the upper end of the column of liquid contained in the chamber space below the partition. Such annular clearance space communicates at its lower end through one or more ports 31 with the space above the piston 26. The combined areas of these ports exceed the size of flow metering clearance 20 across the piston. If this relationship is reversed, then liquid flow control would be transferred to the ports 31. The ports 31 are at the top of the piston cylinder 32, constituting a dependent skirt of the cup shaped wall 28. This dependent skirt 32 is externally screw threaded for assembly within the housing section 6. At its upper end the annular clearance space around the double wall partition is sealed as by means of O-rings 33 carried by a gland nut 34 threaded into the upper end of the rigid wall and engaged with both the top of the wall 28 and the inside of the tube section 6.

Pressure gas entrapped within the housing chamber above the double wall communicates through the passages 29 with the space between the adjoining faces of the double wall and tends forcibly to expand the flexible wall 30 radially away from the rigid wall 28. Such force is transmitted through the liquid confined in the remainder of the housing chamber between the two flexible walls 10 and 30 and acts against the upwardly facing surfaces of the valve parts for urging the valve toward its heat. The extent of deflection of the flexible wall 30 is relatively small but it throughout an area that liquid displacement is sufficient to accommodate travel of the valve toward and from its seat over a distance of approximately one-quarter inch, which is ample for obtaining a wide open valve.

For obtaining adequate flexibility and radial deflection of the tubular wall 30, a particular relationship has been provided between and in the formation of the adjoining faces of the flexible wall and the solid wall, as is best shown in FIGS. 3, 4 and 5. Throughout the major portion of its length, the peripheral face of the wall 28 is formed with a circular succession of axially extending flutes or shallow grooves which alternately are relatively narrow and relatively wide, and in each instance the grooves are of a depth considerably less than the width dimensions of the wider grooves. The formation of the wide grooves 35 and the shallow grooves 36 in alternate circular succession provides a number of rounded peripheral ribs 37 separating the grooves and being in pairs or sets of two closely spaced together longitudinal ribs, with the rib pairs widely spaced apart. By way of suitable dimensions and for exemplary purposes, a rigid wall of 1.156" diameter may be formed with eight wide shallow grooves 35, the maximum depth of each groove being on the order of 0.046" and following a re-entrant line of curvature of uniform radius, and eight narrow shallow grooves 36, cut to a parti-cylindrical depth and radius of approximately 0.031". Circumferential distance between the rib apices is about 0.3479" in the case of the wider grooves and 0.106" in the case of the narrower grooves. Each wide groove preferably is intersected medially of its width by passage perforations 29.

The thin flexible wall, which may be either of spring or ductile metal such as copper, preferably has a wall thickness on the order of 0.007". In linear alignment with the shallow narrow grooves 36, the metal of the flexible wall is deformed inwardly as a circularly spaced succession of internal ribs or bends 38 to project into the grooves 36 and for an interlocking nested fit with paired adjoining ribs 37. Between the several sets of bends 38, the intervening circular wall segments 39 project across or bridge the wider grooves 35. Because of the flexibility of this outer metal wall, it can be bent by external pressure into close abutment with the fluted surface of the rigid wall and it can also be bent outwardly or away from the fluted wall under fluid pressure applied internally of the flexible wall.

In the radial expansion and contraction of the flexible wall, each segment 39 will bend and move to and from a chordal plane, and during the change in arcuate curvature each segment will either elongate or shorten in width and such dimensional change will be compensated for and accommodated by a crowding together or a spreading apart and a wall bending at the internally projected ribs 38. FIG. 5 illustrates one extreme of the bends 38 at the fully elongated chordal plane situation of the circular segments 39, and FIG. 4 illustrates another extreme in which the bends 38 are fully spread apart and the internal faces of the segments 39 are in face to face abutment with the fluted periphery of the rigid wall at the inner limit of wall distortion. FIG. 4 illustrates the relationship of the double wall partition when the valve is in fully open position. In the fully closed position of the valve, the flexible segments 39 will be displaced radially outwardly and may occupy a position on one side or the other of the chordal plane illustrated in FIG. 5 as controlled by choice and engineering requirements for the proportions and travel range requirements.

In assembling the parts, various subassemblies may be first effected but in any event the opposite ends of the bellows 10 are secured by sealed joints to the adapter 16 and to the housing rib 19. With the valve stem 18 in place within the bellows, a predetermined amount of liquid, such as a silicon oil, is introduced through the top of the housing section 6 so as to fill all the space to a level whereby upon placement and threading home of the terminal skirt 32 of the double wall partition, the liquid will completely fill the annular space between the tubular partition and the housing 6. With liquid occupying the space between the flexible walls 30 and 10, the sealing gland nut 34 can now be threaded into position in the upper end of the rigid wall 28 and then the application of the valve seat carrying housing part 8 will, with the valve seated, raise the stop shoulder 27 on the stem above its co-operating seat on the rib 19 and the resulting liquid displacement presses on the outside of the partition wall 30 for an inward deflection from an initial maximum outwardly distended shape to a relationship approximating that shown in FIG. 5, and in which a predetermined space volume exists between the double walls of the partition. Instead of initially preforming the ribs 38 in the thin wall 30, it can be installed in original cylindrical sleeve shape with dependence on liquid pressure application thereto, during assembly and use, for the wall deformation conformity to the fluted wall 28.

After the housing chamber above the double wall partition 28—30 has been properly charged with pressure gas through the conventional inflation valve at its upper end, the assembly will be ready for use. Upon installation in a well, the pressure of a regulated supply of lift gas acting inside the valve cage 8 and on the exposed movable valve parts will tend to raise the valve from its closure seat and against elastic resistance of the pressure gas charge as transmitted through the incompressible liquid column. Axial contraction of the spring metal bellows 10 with upward valve movement will require displacement of liquid from below the constricted passage 20 and through the same into the annular housing space surrounding the flexible wall 30. When valve travel has displaced sufficient liquid for deflection of the flexible wall 30 into coextensive face to face stop abutment within the shallow peripheral grooved face of the fixed wall 28, as seen in FIG. 4, then further movement is stopped and the incompressible liquid bearing against the internal face of the bellows 10 affords solid backing resistance to stress applied externally of the bellows 10 and holds it against collapse or rupture even though fluid pressure within the valve cage is abnormally high.

Whenever fluid pressure exteriorly of the valve decreases below that of the elastic gas entrapped within the housing, then the closing force of the entrapped gas acts to radially expand the segments 39 of the flexible wall 30 and displace the surrounding liquid toward the bellows 10 for urging the valve against its seat 13.

Throughout valve travel in either direction, the restricted passage 20, submerged in the liquid between the flexible walls, is effective in retarding the rate of liquid flow and flow control valve travel proceeds at a relatively slow rate. Should momentary pressure surges or other conditions of critical imbalance occur, abrupt change in travel direction will meet delay and high frequency vibration will be damped.

Because of solid resistance offered by the entrapped liquid to high external pressures on the bellows and because of chatter damping by the liquid, the various parts, including the relatively delicate bellows and the valve seating surfaces, are protected against damaging stress and fatigue bending and their lives are materially prolonged. The preferred embodiment of the invention as described is subject to such modification as comes within the scope of the appended claims.

What is claimed is:

1. In a fluid pressure responsive device, a tubular rigid wall having a series of radial perforations therethrough and a plurality of axially extended and circularly spaced surface flutes arranged with adjoining flutes of different widths alternately wide and narrow, an imperforate tube of flexible material fitted to said wall in sleeved relation one to the other and sealed thereto at opposite ends beyond said radial perforations, said imperforate tube having axially extended narrow bends in the wall thereof aligned with and projected as locating ribs into the narrow flutes of said rigid wall and having other portions thereof bridging the spaces on substantially chordal lines between said narrow bends and being arranged to flex radially into and out of seating abutment with the wide fluted surfaces of the rigid wall in response to differential pressures on opposite faces of said other portions.

2. In a fluid pressure responsive device as in claim 1, wherein the wide surface flutes are several times wider than they are deep and the flexing toward and from the surfaces thereof of said other portions of the imperforate tube is accompanied by a width change of said other portions and is compensated for by corresponding width change in said narrow bends.

3. In a fluid pressure responsive device, a pair of concentrically fitted tubular walls, one of said walls being a thin imperforate flexible wall for deflection into and out of abutment with the other wall in response to differential pressures on opposite faces thereof, said other wall being a rigid wall joined to axially spaced apart portions of the flexible wall to seal the intervening region of the wall abutment faces, means through the rigid wall communicating said intervening region with the side of the rigid wall opposite to the flexible wall, a series of circularly spaced apart and axially extended ribs in the abutment face of said rigid wall arranged in widely spaced apart pairs of closely spaced apart ribs to thereby define a circular succession of alternately wide and narrow grooves and which in depth are considerably less than the width of the alternate wide grooves and a series of circularly spaced shallow bends in said flexible wall affording ribs projected therefrom into the narrow spaces between the pairs of ribs on said rigid wall, said bends being capable of flexing to changing curvatures to accommodate radial flexing of the other portions of the flexible wall into and out of said wide grooves of the rigid wall.

4. In a fluid pressure responsive device, a pair of tubular walls sleeved one on the other, one of said tubular walls being rigid and having a passage therethrough and the other tubular wall being an imperforate wall of flexible material joined to the rigid wall beyond said passage to seal the space between adjoining faces of the walls, the flexible wall having segments thereof radially deflectible to and from substantially chordal planes in response to differential pressures on opposite faces thereof and also having shallow bends connecting said radially deflectible segments and being circularly spaced apart for distances greater than the bend widths and capable of bending curvature variation in compensation for radial deflection of said segments to and from face to face abutment with the rigid wall.

References Cited in the file of this patent

UNITED STATES PATENTS

| | | |
|---|---|---|
| 2,223,691 | Lockwood | Dec. 3, 1940 |
| 2,677,393 | Cornelius | May 4, 1954 |
| 2,731,977 | McGowen | Jan. 24, 1956 |
| 2,748,792 | Davis | June 5, 1956 |
| 2,771,270 | Selberg | Nov. 20, 1956 |
| 2,825,553 | Smith | Mar. 4, 1958 |
| 2,850,276 | Jackson | Sept. 2, 1958 |